(12) United States Patent
Gao et al.

(10) Patent No.: US 10,793,472 B2
(45) Date of Patent: Oct. 6, 2020

(54) ANTI-SAGGING GYPSUM PRODUCT AND A METHOD TO MANUFACTURE

(71) Applicants: Xiaotong Gao, Shanghai (CN); Huifen Li, Shanghai (CN); Hao Song, Shanghai (CN); Ke Zhang, Shanghai (CN)

(72) Inventors: Xiaotong Gao, Shanghai (CN); Huifen Li, Shanghai (CN); Hao Song, Shanghai (CN); Ke Zhang, Shanghai (CN)

(73) Assignee: SAINT-GOBAIN PLACO (FR)

( * ) Notice: Subject to any disclaimer, the term of this patent is extended or adjusted under 35 U.S.C. 154(b) by 1104 days.

(21) Appl. No.: 14/379,730

(22) PCT Filed: Dec. 3, 2012

(86) PCT No.: PCT/CN2012/085749
§ 371 (c)(1),
(2) Date: Aug. 19, 2014

(87) PCT Pub. No.: WO2014/085962
PCT Pub. Date: Jun. 12, 2014

(65) Prior Publication Data
US 2015/0011138 A1    Jan. 8, 2015

(51) Int. Cl.
*B28B 1/30* (2006.01)
*C04B 24/06* (2006.01)
*C04B 28/14* (2006.01)
*B28B 17/00* (2006.01)
*C04B 111/00* (2006.01)
*C04B 111/40* (2006.01)

(52) U.S. Cl.
CPC ............... *C04B 24/06* (2013.01); *B28B 1/30* (2013.01); *B28B 17/0036* (2013.01); *C04B 28/14* (2013.01); *C04B 2111/0062* (2013.01); *C04B 2111/00094* (2013.01); *C04B 2111/00612* (2013.01); *C04B 2111/40* (2013.01); *Y10T 428/31996* (2015.04); *Y10T 442/60* (2015.04)

(58) Field of Classification Search
CPC ......... C04B 11/00; C04B 24/06; C04B 24/04; C04B 24/045; C04B 24/08; C04B 28/14; C04B 2111/40
USPC ........................................................ 106/772
See application file for complete search history.

(56) References Cited

U.S. PATENT DOCUMENTS

| | | | | |
|---|---|---|---|---|
| 4,391,645 A * | 7/1983 | Marcellis | ................ | C04B 28/02 106/809 |
| 4,604,142 A * | 8/1986 | Kamohara | ............ | A61K 6/0625 106/38.51 |
| 4,918,136 A * | 4/1990 | Kawaguchi | ................ | C09J 4/00 523/116 |
| 5,180,518 A * | 1/1993 | Sugihara | ............... | A23L 3/3436 252/184 |
| 6,162,839 A * | 12/2000 | Klauck | ................... | C04B 24/08 106/646 |
| 6,342,284 B1 | 1/2002 | Yu et al. | | |
| 6,352,585 B1 * | 3/2002 | Diesso | .................... | C04B 24/04 106/35 |
| 6,566,434 B1 * | 5/2003 | Mayer | ................. | C04B 24/2676 427/393.6 |
| 9,133,060 B2 * | 9/2015 | Gao | ........................ | C04B 28/14 |
| 2007/0031779 A1 * | 2/2007 | Tokui | ................ | B05C 17/00516 433/89 |
| 2008/0148997 A1 * | 6/2008 | Blackburn | .............. | C04B 28/14 106/708 |
| 2009/0110946 A1 * | 4/2009 | Martin | .................... | C04B 24/34 428/537.7 |
| 2010/0199545 A1 * | 8/2010 | Hassan | .................... | A23D 9/00 44/275 |

(Continued)

FOREIGN PATENT DOCUMENTS

| | | |
|---|---|---|
| CA | 1021808 | 11/1977 |
| CN | 1237148 A | 12/1999 |
| CN | 1400958 A | 4/2001 |

(Continued)

OTHER PUBLICATIONS

PubChem database entry for L-Ascrobyl 6-palmitate (https://pubchem.ncbi.nlm.nih.gov/compound/54680660#section=Depositor-Supplied-Synonyms&fullscreen=true) (PubChem). (Year: 2018).*
Dictionary of Chemical Engineering. Oxford University Press, p. 59. Online version available at: https://app.knovel.com/hotlink/toc/id:kpDCE00021/dictionary-chemical-engineering/dictionary-chemical-engineering (Schaschke). (Year: 2014).*

(Continued)

*Primary Examiner* — Jeremy R Pierce
(74) *Attorney, Agent, or Firm* — Dorsey & Whitney LLP

(57) ABSTRACT

The present invention provides a composition, a gypsum board and their preparation method and the use of ascorbic acid as an anti-sagging additive in a gypsum board. Said gypsum board comprises set gypsum prepared from the composition; while said composition comprises hemi-hydrate gypsum, water and a compound comprising

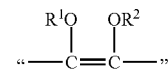

group and no carboxylate groups. The set gypsum prepared from the said composition shows better anti-sagging or deformation resisting property. The gypsum board of the present invention is hardly distorted and has stronger stability even in the condition of high humidity, thus improve the quality of the gypsum board to meet the demands of the customer.

17 Claims, No Drawings

(56) References Cited

U.S. PATENT DOCUMENTS

| | | | |
|---|---|---|---|
| 2012/0088114 A1* | 4/2012 | Rohlf | B32B 13/08 |
| | | | 428/537.7 |
| 2012/0136096 A1* | 5/2012 | Naranjo | C04B 28/02 |
| | | | 524/5 |

FOREIGN PATENT DOCUMENTS

| | | | | |
|---|---|---|---|---|
| CN | 1307547 | A | | 8/2001 |
| CN | 101747014 | A | | 6/2010 |
| CN | 102276227 | A | | 12/2011 |
| GB | 191413542 | | | 3/1915 |
| GB | 354502 | | * 8/1931 | ............ C04B 24/38 |
| GB | 354502 | A | * 8/1931 | ............ C04B 24/38 |
| GB | 715337 | | | 9/1954 |
| GB | 1226333 | A | | 3/1971 |
| GB | 1481785 | A | | 8/1977 |
| JP | 2001-048533 | A | | 2/2001 |
| JP | 2003523910 | A | | 8/2003 |
| KR | 2002-0022289 | A | | 3/2002 |
| WO | 00/06518 | | | 2/2000 |

OTHER PUBLICATIONS

Sigma-Aldrich Catalog Pyrogallol (Year: 2018).*
Japanese Intellectual Patent Office, First Office Action for Japanese Application No. 2015-544303 dated Sep. 13, 2016 (5 pages).
Taiwan Intellectual Property Office, First Office Action for Taiwan Application No. 103105248 dated May 5, 2015, 7 pages.
Canadian Intellectual Property Office; Office Action for application No. 2,842,221 dated Mar. 25, 2015, 3 pages.
EP Search Report dated Jul. 15, 2016 for International Application No. PCT/CN2012/085749, 8 Pages.
Boles, Jennifer Snow, et al., "Aqueous thermal degradation of gallic acid", Geochimica et Cosmochimica Acta., vol. 52, No. 2, dated Feb. 1, 1988.

* cited by examiner

ANTI-SAGGING GYPSUM PRODUCT AND A METHOD TO MANUFACTURE

CROSS-REFERENCE TO RELATED APPLICATIONS

The present application is a Section 371 National Stage Application of International Application No. PCT/CN2012/085749, filed on Dec. 3, 2012, which is hereby incorporated by reference in its entirety.

FIELD OF THE DISCLOSURE

The present invention relates to a gypsum product, in particular to a gypsum board composition, a gypsum board and its preparation methods and the use of ascorbic acid as an anti-sagging additive in a gypsum board.

BACKGROUND OF THE DISCLOSURE

In the field of modern architecture, gypsum (main component being calcium sulfate dihydrate) is a major material used in the construction industry. Examples include a gypsum board for forming the ceilings and walls in a building, and conventional mortar for producing a finished surface on the internal ceilings/walls.

During the preparation of gypsum products, a mixture of calcined gypsum (calcium sulfate hemihydrate and/or anhydrous calcium sulfate) and water is cast, where the calcined gypsum (plaster) is hydrated by water to form a solidified gypsum which comprises crystalline hydrated gypsum matrix (calcium sulfate dihydrate), so that the gypsum products have high structural strength. Thus, the gypsum product has advantages of light weight and high strength and so is widely used in building products.

However, if the gypsum product is under conditions of high humidity for a long time, deformation behavior can occur, at times referred to as sagging or humidified deflection in the industry. Gypsum products that show this deformation behaviour will present poor aesthetics after installation and will require expensive remediation work to correct. Therefore, how to overcome the poor deformation behaviour of solidified gypsum has been the focus of study in the field of construction, and some achievements have been made.

For example, Chinese patent publication No. CN101747014A discloses a method to improve the anti-sagging of the gypsum product by adding boric acid as additives into the calcined gypsum. U.K. patent GB1481788A discloses using Gallic acid as anti-sagging additive in order to improve anti-sagging of a gypsum board. U.K. patent GB 1226333A discloses that precast gypsum plaster sheets, slabs and blocks containing tartaric acid have a greater resistance to plastic flow than similar articles not containing tartaric acid. It is also known that phosphates can be used as disclosed in U.S. Pat. No. 6,342,284.

SUMMARY

In view of the behaviour that the prior gypsum products are prone to sagging and creeping under humid conditions and thus have poor resistance to deformation and in turn poor stability, the present invention provides a composition and a gypsum board and preparation method for the gypsum board. Said composition comprises anti-deformation additives, and the gypsum board made of said composition has good anti-deformation ability, especially the anti-sagging ability, under humid conditions, thus the stability of the gypsum board is improved.

The present invention provides a gypsum board composition, a gypsum board and its preparation method and the use of ascorbic acid as an anti-sagging additive in the gypsum boards.

Said composition comprises gypsum and an anti-deformation additive; said anti-deformation additive comprises a compound comprising a group shown in chemical formula (1):

and the compound comprises no carboxylate groups. Said gypsum mentioned in composition of this application is hemi-gypsum (calcium sulfate hemi-hydrate).

The present invention further provides a method for forming the composition, comprising: mixing gypsum powder and an anti-deformation additive with water; and stirring the mixture, wherein the anti-deformation additive comprises a compound comprising a group shown in chemical formula (1):

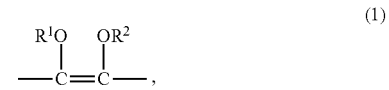

and the compound comprises no carboxylate groups, wherein the $R^1$ and/or $R^2$ is hydrogen or metal ion or alkyl group or alkoxy group or alkenyl group.

Optionally, the composition further comprises one or more components selected from starch, foaming agent, accelerator, dispersant, and the like known to skilled person in the art of gypsum board and plaster manufacture, as auxiliary additives.

The present invention further provides a gypsum board comprising of gypsum, starch, foaming agent (optionally), dispersant, accelerator and an anti-deformation additive, and materials known to skilled persons in the art of gypsum board and plaster manufacture, wherein the anti-deformation additive comprises a compound comprising a group shown in chemical formula (1):

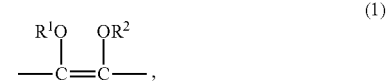

and the compound comprises no carboxylate groups; wherein the $R^1$ and/or $R^2$ is hydrogen or metal ion or alkyl group or alkoxy group or alkenyl group. Said gypsum mentioned in final gypsum board of this application is dihydrate gypsum (calcium sulfate dihydrate).

The present invention further provides a method for forming a gypsum board, comprising: mixing hemihydrate gypsum, water, starch, a foaming agent (optionally), an accelerator, a dispersant, and an anti-deformation additive, wherein the anti-deformation additive comprises a compound comprising a group shown in chemical formula (1):

$$\begin{array}{c} R^1O \quad OR^2 \\ | \quad | \\ -C=C- \end{array} \quad (1)$$

and the compound comprises no carboxylate groups; wherein the $R^1$ and/or $R^2$ is hydrogen or metal ion or alkyl group or alkoxy group or alkenyl group; stirring the mixture to form a slurry; disposing the slurry between two liners to form a sandwich structures; forming a first board based on the sandwich structure; cutting the first board into a plurality of second boards with desired lengths after a hardening process; drying the plurality of second boards to evaporate excess water.

The slurry is typically deposited on a liner e.g. a paper sheet, and is covered with a further liner, such that the slurry is sandwiched between the two liners. This sandwich structure is then passed through a pair of forming plates or rolls that determine the thickness of the board. After this, the structure passes along a conveyor line, to allow time for the stucco slurry to hydrate and harden. The hardened structure is cut to provide multiple boards of the desired length and these are transferred to a drying system to allow excess water to evaporate.

The present invention also provides the use of a compound comprising a group shown in chemical formula (1) and comprising no carboxyl groups as anti-sagging additive in a gypsum product.

Optionally, the above chemical formula (1) has a structure of —COH═COH—.

Optionally, the above-mentioned compound comprising a group shown in chemical formula (1) and comprising no carboxyl groups is selected from at least one group consisting of ascorbic acid, ascorbic acid derivative and ascorbate.

Optionally, a mass percentage of the compound comprising a group shown in chemical formula (1) and comprising no carboxylate groups to the gypsum, in the composition and gypsum product, ranges from 0.01 to 5.0%, preferably from 0.1 to 1.0%.

Optionally, said ascorbic acid derivative is L-Ascorbyl stearate (structure:

)

and L-Ascorbyl 6-palmitate (structure:

).

Optionally, said ascorbate is calcium ascorbate.

Optionally, the compound comprising a group shown in chemical formula (1) comprises a group shown in chemical formula (2), $$(2)$$

Optionally, the compound comprising a group shown in chemical formula (2) is Tannic acid (structure:

chemical formula: $C_{76}H_{52}O_{46}$) or Benzene-1,2,3-triol (structure:

).

Optionally, the compound comprising a group shown in chemical formula (1) comprises a group shown in chemical formula (3), $$\begin{array}{c} R^1O \quad OR^2 \\ | \quad | \\ -C=C-C-O- \end{array} \quad (3)$$

Optionally, the compound comprising a group shown in chemical formula (1) comprises a group shown in chemical formula (4), $$\begin{array}{c} R^1O \quad OR^2 \\ | \quad | \\ -C=C-C-O- \\ \qquad\quad \| \\ \qquad\quad O \end{array} \quad (4)$$

The present invention further provides the use of ascorbic acid as an anti-sagging additive in a gypsum product.

Compared to the prior art, the composition, gypsum product and the preparation thereof have the following advantages:

1. in the invention, said gypsum product comprises set gypsum prepared from the composition; while said composition comprises hemi-hydrate gypsum, water and a compound comprising

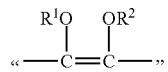

group and no carboxyl groups. The set gypsum prepared from the said composition shows better anti-deformation performance and improved anti-deformation property of the gypsum product efficiently than the prior art. The gypsum product of the present invention is hardly distorted and has stronger stability even in the condition of high humidity, thus improve the quality of the gypsum product to meet the requests of high stability;

Moreover, ascorbic acid, tannic acid and Benzene-1,2,3-triol as specific examples of compound with a group "—COH═COH—" in the optional embodiments are inexpensive and readily available which reduces the cost of the composition of the present invention.

2. In addition, the compound does not affect the setting of the gypsum slurry thus is more favorable for the production per se in comparison to other anti-sagging additives such as tartaric acid, an additive well known and used in the industry, which slows down the setting of the gypsum slurry.

DETAILED DESCRIPTION OF THE DISCLOSURE

As discussed in the background art, set gypsum has advantages of light weight and high structure strength, and has been widely used in gypsum products in architecture industry. However, it have been discovered in practice that, gypsum product with set gypsum as main component will occur sagging and creeping when exposed to high humidity. The behaviour affects the appearance of gypsum product, making unable to meet the gypsum product standards.

To solve the defect of poor anti-deformation ability and poor stability of prior gypsum, the present invention provides a composition and a gypsum product made of the composition and their preparation methods. The gypsum product made of the composition of the invention has significantly improved anti-deformation ability (in particular anti-sagging ability), compared with prior art.

The composition of the present invention comprises gypsum, water and anti-deformation additive. The anti-deformation additive comprises a compound comprising a group shown in chemical formula (1)

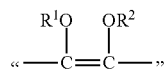

and no carboxyl groups. The group

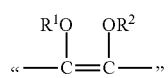

may be contained in any structure selected from open chain (e.g. —OHC═COH—CO—), aliphatic ring (e.g.

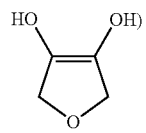

or aromatic ring (e.g.

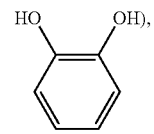

and its performance in the compound structure is not limited. Said gypsum mentioned in composition is hemi-hydrate gypsum (calcium sulfate hemi-hydrate).

Specifically, the compound comprising a group shown in chemical formula (1) comprises a group shown in chemical formula (2), a group shown in chemical formula (3) or is a compound with a group shown in chemical formula (4).

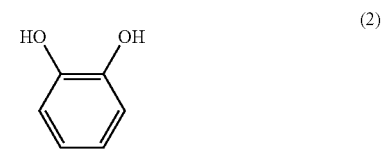

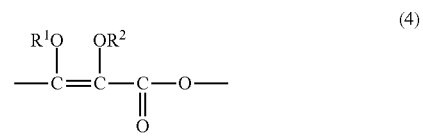

Wherein, more specifically, the compound comprising a group shown in chemical formula (1) may preferably be ascorbic acid (systematic name: 2,3,4,5,6-pentahydroxy-2-hexenoic acid-4-lactone), tannic acid (or named Acidum Tannicum), Benzene-1,2,3-triolor, the derivatives thereof. It should be understood that the ascorbic acid may be L-ascorbic acid, D-ascorbic acid, L-araboascorbic acid and D-araboascorbic acid.

Wherein, the mass ratio of the compound comprising group

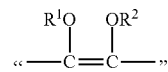

to the hemi-hydrate gypsum in the composition ranges from 0.01% to 5.0%, preferably from 0.1% to 1.0%.

In order to improve the quality of the gypsum board made of the composition, the composition may further comprise one or more additives selected from foaming agent, dispersant, accelerator and starch. The preparation method of the composition comprises: mixing gypsum powder and an anti-deformation additive in a specific ratio with water; and stirring the mixture, wherein the anti-deformation additive comprises a compound comprising a group shown in chemical formula (1) and no carboxylate groups. Thereby, the composition of the present invention can be obtained, and the operation process is simple thus large-scale industrial promotion is possible.

The present invention also provides a gypsum board made of above-mentioned composition, the components of the gypsum product in particular comprising gypsum, starch, foaming agent, dispersant, accelerator and anti-deformation additive comprising a compound with a group shown in chemical formula (1)

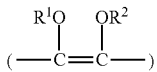

but without carboxyl group (—COOH). The gypsum mentioned in final gypsum board is dihydrate gypsum.

Wherein, the final product may be gypsum board, and the periphery of the gypsum board can be coated by a liner such as paper sheet, non-woven mat comprising of polymeric and/or glass fibers and the like to form a gypsum product with specific shape and use.

In the production process of the gypsum board, first, gypsum, starch, a foaming agent, an accelerator, a dispersant, an anti-deformation additive comprising a compound with a group shown in chemical formula (1)

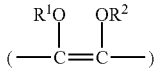

but without carboxyl groups, and materials known to skilled person in the art of gypsum board and plaster manufacture, are mixed in water and stir the mixture to form a slurry; then the slurry is typically deposited on a liner e.g. a paper sheet, and is covered with a further liner, such that the slurry is sandwiched between the two liners. This sandwich structure is then passed through a pair of forming plates or rolls that determine the thickness of the board. After this, the structure passes along a conveyor line, to allow time for the stucco slurry to hydrate and harden. The hardened structure is cut to provide multiple boards of the desired length and these are transferred to a drying system to allow excess water to evaporate.

To make the above-mentioned purpose, features and advantages of the present invention more obvious and easy to understand, specific embodiments of the invention and the comparative experimental data of the test of anti-sagging performance for the examples of the invention and those gypsum products with existing additives are used to further illustrate the composition and gypsum product of this invention and their preparation method and excellent anti-sagging performance of the gypsum product obtained by the invention.

More specific details are described in the following description in order to fully understand the present invention. However, the present invention can also be implemented by other means than as described here. Thus, the present invention is not constructed as limited by the following specific embodiments.

Example 1

I. Preparation process of the examples and comparative examples are as follows:

Mix a specific quantity of additive powder (the additives here are only additives in examples and comparative examples shown in Table 1) and 500 g of calcined calcium sulfate hemihydrate powder with 350 g of water, and stir the mixture for 15 s to produce a plurality of slurries containing different additives correspondingly;

The obtained slurries are poured into individual moulds (all the moulds are the same) to prepare gypsum plates, each having dimensions of 400×400×10 mm, after 12 hours, the molded gypsum plates are removed and dried at 50~70° C. for 10~15 hours, and then dried at 30~50° C. for 20~30 hours in sequence to produce a plurality of gypsum plate samples corresponding to different additives to be tested. The obtained gypsum plates are cut into 320×40×10 mm after conditioning for 24 hours at a temperature of 20° C. and relative humidity of 50% RH for anti-sagging test.

II. Process of anti-sagging test.

Test environment: constant temperature 20±0.5° C.; relative humidity: 93±3% RH.

Each gypsum plate is then laid in a horizontal position upon three supports and the distance between two supports is 300 mm. A metal loading block (its mass is shown in Table 1 below) is placed at the central part of the gypsum plate to accelerate the sag process. During a period of 24 hour, the sag distance of the central part of gypsum plate samples is continuously measured by a laser displacement meter (model: Keyence IL-065), and the final sag distance of each gypsum plate sample is recorded after 24 hours.

Components in the examples and comparative examples (additives taken from prior arts), and test data of corresponding gypsum plate of examples and comparative examples are shown in Table 1:

TABLE 1

Table of sagging resistance test data of gypsum plate samples

| Number | Additive | Content of additive (%) | Sag distance after 24 hours (mm) | Mass of the loading block (g) | Result parameter (mm/kg) |
|---|---|---|---|---|---|
| Example 1 Sample 1 | L-Ascorbic acid | 0.1 | 0.21 | 400 | 0.51 |
| Example 1 Sample 2 | Benzene-1,2,3-triol | 0.1 | 0.32 | 500 | 0.64 |
| Example 1 Sample 3 | Tannic acid | 0.1 | 0.45 | 500 | 0.90 |
| Comparative example 1 | Tartaric acid | 0.1 | 0.51 | 500 | 1.01 |
| Comparative example 2 | modified Aluminum Tripolyphosphate | 0.1 | 0.70 | 500 | 1.41 |

Result parameter=Sagging distance after 24 hours Mass of the loading block, the smaller the value is, the better the sagging resistance of the gypsum plate sample is.

The content of additive is: the mass of the additive in each example/the mass of calcium sulfate hemihydrate.

III. Analysis of test results: it is known from the above table of sagging resistance of corresponding gypsum plate samples containing different additives that:

After sagging resistance test of the gypsum plates in the examples containing compounds comprising

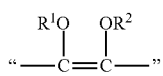

groups (it is ascorbic acid in example 1 sample 1, Benzene-1,2,3-triol

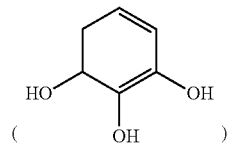

in example 1 sample 2, and tannic acid example 1 sample 3) as additives and the gypsum plates in the comparative examples containing compounds comprising tartaric acid and modified aluminum tripolyphosphate, as additives, it is shown that the result parameters of three samples in the examples are significantly smaller than that in comparative examples (smaller result parameter is the better). Wherein, compounds comprising tartaric acid

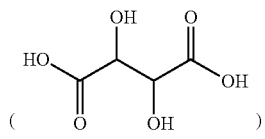

comprising ortho "—OH" groups but no "—C=C—" group.

According to Table 1, it is known from the test data of sagging resistance of the gypsum plate samples containing different additives from existing gypsum plate samples in comparative examples, the gypsum plate in present invention that contains compounds comprising "—COH=COH—" groups but no carboxyl group as additives has better sagging resistance and better stability. Particularly, the sagging resistance of gypsum plate containing ascorbic acid as additive (sample 1 in example) is 2.7 times of that containing modified aluminum tripolyphosphate as additives (1.41/0.51=2.7) and is 2 times of that containing tartaric acid as additives (1.01/0.51=2).

Also, based on the especially good sagging resistance of gypsum plate with ascorbic acid as the additive, gypsum plates containing ascorbyl stearate and ascorbyl palmitate with similar constructer to ascorbic acid as their precursor also show quite good sagging resistance.

The sagging resistance of gypsum plates in example 1 sample 2 (with Benzene-1,2,3-triol as additive) and example 1 sample 2 (with tannic acid as additive) is significantly better than that containing compounds comprising carboxyl anion as additives.

Example 2

Mix 700 g of calcined desulfogypsum that containing 0.175~0.35 g accelerator to achieve a target initial set time of 6 to 7 mins for the convenience of lab operation, 3.811 g starch and ascorbic acid of different amount with 490 g water that containing 3 g foaming agent and 4.375~7 g dispersant to achieve a target spread of 90 to 100 mm also for the convenience of lab operation, and stir the mixture for 15 s to produce a plurality of slurries containing different additives correspondingly.

The obtained slurries are poured into the moulds (all the moulds are the same). Wherein, before the slurry being poured into the mould, a lining paper is placed in the mould, and the slurry is poured onto the lining paper; then another lining paper is placed on the upper surface of the slurry in the mould, press the upper lining paper to make redundant slurry overflow, so that the slurry between two lining papers is solidified to produce a gypsum plate with two lining papers on either side of the surface. The mould is removed and gypsum plate is taken out and then put into the oven and dried for three steps at 180° C. for 20 minutes, and 60° C. for 12 hours and 40° C. for 24 hours in sequence to produce a plurality of gypsum plate samples containing different amount of ascorbic acid. The components of the gypsum plate samples are shown in Table 2.

The gypsum plate samples are cut into the same shape as example 1, and the sagging resistance test of the gypsum plate containing different amount of ascorbic acid is taken with the same method under the same condition. The results are shown in Table 2.

TABLE 2

Sagging resistance test data of the gypsum plate samples.

| Number | Anti-deformation additive | Mass ratio of anti-deformation additive to hemi-hydrate gypsum (%) | Sag distance after 24 hours (mm) | Mass of the loading block (g) | Result parameter* (mm/kg) |
| --- | --- | --- | --- | --- | --- |
| Comparative example | N/A | 0 | 1.88 | 500 | 3.76 |
| Example 2 Sample 1 | Ascorbic acid | 0.02 | 1.54 | 500 | 3.08 |
| Example 2 Sample 2 | Ascorbic acid | 0.05 | 1.44 | 500 | 2.88 |
| Example 2 Sample 3 | Ascorbic acid | 0.1 | 1.16 | 500 | 2.32 |
| Example 2 Sample 4 | Ascorbic acid | 0.32 | 0.83 | 500 | 1.66 |
| Example 2 Sample 5 | Ascorbic acid | 0.5 | 0.79 | 500 | 1.58 |
| Example 2 Sample 6 | Ascorbic acid | 0.7 | 0.70 | 500 | 1.40 |
| Example 2 Sample 7 | Ascorbic acid | 1.0 | 0.73 | 500 | 1.46 |
| Example 2 Sample 8 | Ascorbic acid | 3.0 | 0.79 | 500 | 1.58 |
| Example 2 Sample 9 | Ascorbic acid | 5.0 | 1.16 | 500 | 2.32 |

*Result parameter = Sag distance after 24 hours/Mass of the loading block

As recorded in example 1, compared to existing gypsum products, the gypsum product containing compound comprising

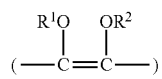

groups shown in chemical formula (1) but no carboxylate group (—COOH) as anti-deformation additive has significantly improved sagging resistance, and the gypsum product made by the compounds in which the mass ratio of the compound comprising

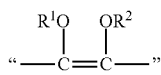

groups and hemi-hydrate gypsum ranging from 0.01% to 5.0% has quite high sagging resistance, and in this range, the mass ratio of the compound comprising

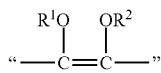

groups and hemi-hydrate gypsum prefers 0.1~1.0%.

Example 3: Effect of Ascorbic Acid on Setting Time

An existing problem of the gypsum board industry is that the current anti-sagging additives, such as carboxylic acids, increase the set time of the gypsum slurry, which deleteriously affects the production line. To solve this problem, additional accelerating agents need to be used thus increase the production cost. Table 3 shows the initial and final set time of gypsum slurry with L-Ascorbic acid and L-Tartaric acid of different levels. The set time was measured by using a Vicat instrument which is known to skilled persons in the art of gypsum board and plaster manufacture. It can be seen in Table 3 that L-Tartaric acid significantly increased the set time of the gypsum slurry. In contrast, L-Ascorbic acid had little effect on the set time.

TABLE 3

Set time of gypsum slurry with different anti-deformation additives.

| Number | Anti-deformation additive | Mass ratio of anti-deformation additive to hemi-hydrate gypsum (%) | Initial set time (mm:ss) | Final set time (mm:ss) |
| --- | --- | --- | --- | --- |
| Comparative example 1 | N/A | 0 | 4:42 | 6:18 |
| Comparative example 2 | L-Tartaric acid | 0.5 | 15:12 | 18:48 |
| Comparative example 3 | L-Tartaric acid | 1.0 | 35:54 | 36:57 |
| Example 3 Sample 1 | L-Ascorbic acid | 0.5 | 4:39 | 6:39 |
| Example 3 Sample 2 | L-Ascorbic acid | 1.0 | 4:54 | 6:45 |

The present invention also provides the application of the ascorbic acid as an anti-sagging additive in the gypsum product. Anti sagging additives in any forms comprising ascorbic acid and the application of the additives in prevent sagging of the gypsum product are with the protection of the present invention.

The preferred embodiments disclosed hereinbefore should not be construed as limiting the present invention, any technicians in this field could make possible changes within the spirit and scope of the invention, therefore the protection scope of present invention should be defined by the claims.

What is claimed is:

1. A gypsum board composition, comprising:
   gypsum, starch, and an anti-deformation additive,
   wherein the anti-deformation additive is selected from L-Ascorbyl 6-palmitate, L-Ascorbyl stearate, Benzene-1,2,3-triol, or any combination thereof, and
   wherein a mass percentage of the anti-deformation additive ranges from 0.1% to 5% of the mass of the gypsum.

2. The composition according to claim 1, wherein the anti-deformation additive is Benzene-1,2,3-triol.

3. The composition according to claim 1, wherein the anti-deformation additive is L-Ascorbyl 6-palmitate or L-Ascorbyl stearate.

4. A method for forming a composition, comprising:
   mixing gypsum powder, starch, and an anti-deformation additive with water to create a mixture; and
   stirring the mixture,
   wherein the anti-deformation additive is selected from L-Ascorbyl 6-palmitate, L-Ascorbyl stearate, or any combination thereof, and
   wherein a mass percentage of the anti-deformation additive ranges from 0.1% to 5% of the mass of the gypsum.

5. A gypsum board, comprising:
   gypsum, starch, dispersant, accelerator, an anti-deformation additive, and a foaming agent,
   wherein the anti-deformation additive is selected from ascorbic acid, L-Ascorbyl 6-palmitate, L-Ascorbyl stearate, Benzene-1,2,3-triol, or any combination thereof, and
   wherein a mass percentage of the anti-deformation additive ranges from 0.1% to 5% of the mass of the gypsum.

6. The gypsum board according to claim 5, wherein the anti-deformation additive is Benzene-1,2,3-triol.

7. The gypsum board according to claim 5, wherein the board is wrapped by a liner.

8. The gypsum board according to claim 7, wherein the liner is selected from a paper sheet, a non-woven mat comprising of polymeric and/or glass fibers, or the like.

9. A method for forming a gypsum board, comprising:
   mixing gypsum, water, starch, an accelerator, a dispersant, an anti-deformation additive, and a foaming agent, to create a mixture;
   wherein the anti-deformation additive is selected from ascorbic acid, L-Ascorbyl 6-palmitate, L-Ascorbyl stearate, Benzene-1,2,3-triol, or any combination thereof, and wherein a mass percentage of the anti-deformation additive ranges from 0.1% to 5% of the mass of the gypsum;
   stirring the mixture to form a slurry;
   disposing the slurry between two liners to form a sandwich structure;
   forming a first board based on the sandwich structure;
   cutting the first board into a plurality of second boards with desired lengths after a hardening process;
   drying the plurality of second boards to evaporate excess water.

10. The method according to claim 9, wherein the anti-deformation additive is Benzene-1,2,3-triol.

11. A method of reducing deformation in a gypsum product comprising adding at least one compound selected from ascorbic acid, L-Ascorbyl 6-palmitate, L-Ascorbyl stearate, Benzene-1,2,3-triol, or any combination thereof as an anti-deformation additive in the gypsum product, and wherein a mass percentage of the anti-deformation additive ranges from 0.1% to 5% of the mass of the gypsum.

12. A gypsum board, comprising:
gypsum, starch, dispersant, accelerator, and an anti-deformation additive,
wherein the anti-deformation additive is selected from ascorbic acid, L-Ascorbyl 6-palmitate, L-Ascorbyl stearate, Benzene-1,2,3-triol, or any combination thereof, and
wherein a mass percentage of the anti-deformation additive ranges from 0.1% to 5% of the mass of the gypsum.

13. The gypsum board according to claim 12, wherein the anti-deformation additive is Benzene-1,2,3-triol.

14. The gypsum board according to claim 12, wherein the board is wrapped by a liner.

15. The gypsum board according to claim 14, wherein the liner is selected from a paper sheet, a non-woven mat comprising of polymeric and/or glass fibers, or the like.

16. A method for forming a gypsum board, comprising:
mixing gypsum, water, starch, an accelerator, a dispersant, and an anti-deformation additive, to create a mixture;
wherein the anti-deformation additive is selected from ascorbic acid, L-Ascorbyl 6-palmitate, L-Ascorbyl stearate, Benzene-1,2,3-triol, or any combination thereof, and wherein a mass percentage of the anti-deformation additive ranges from 0.1% to 5% of the mass of the gypsum;
stirring the mixture to form a slurry;
disposing the slurry between two liners to form a sandwich structure;
forming a first board based on the sandwich structure;
cutting the first board into a plurality of second boards with desired lengths after a hardening process;
drying the plurality of second boards to evaporate excess water.

17. The method according to claim 16, wherein the anti-deformation additive is Benzene-1,2,3-triol.

* * * * *

UNITED STATES PATENT AND TRADEMARK OFFICE
CERTIFICATE OF CORRECTION

Page 1 of 1

PATENT NO. : 10,793,472 B2
APPLICATION NO. : 14/379730
DATED : October 6, 2020
INVENTOR(S) : Xiaotong Gao et al.

It is certified that error appears in the above-identified patent and that said Letters Patent is hereby corrected as shown below:

On the Title Page

In item (71), delete "Applicants: Xiaotong Gao, Shanghai (CN); Huifen Li, Shanghai (CN); Hao Song, Shanghai (CN); Ke Zhang, Shanghai (CN)" and insert therefor -- Applicant: SAINT-GOBAIN PLACO, Suresnes (FR) --.

Signed and Sealed this
Twelfth Day of January, 2021

Andrei Iancu
*Director of the United States Patent and Trademark Office*